(12) United States Patent
Herre (10) Patent No.: US 8,567,694 B2
(45) Date of Patent: Oct. 29, 2013

(54) TEST METHOD AND TEST APPARATUS FOR CHECKING THE FUNCTION OF A PAINTING DEVICE

(75) Inventor: Frank Herre, Oberriexingen (DE)

(73) Assignee: Durr Sysems GmbH, Bietigheim-Bissingen (DE)

( * ) Notice: Subject to any disclaimer, the term of this patent is extended or adjusted under 35 U.S.C. 154(b) by 548 days.

(21) Appl. No.: 12/809,829

(22) PCT Filed: Dec. 3, 2008

(86) PCT No.: PCT/EP2008/010241
§ 371 (c)(1),
(2), (4) Date: Jun. 21, 2010

(87) PCT Pub. No.: WO2009/083087
PCT Pub. Date: Jul. 9, 2009

(65) Prior Publication Data
US 2010/0274378 A1   Oct. 28, 2010

(30) Foreign Application Priority Data
Dec. 21, 2007 (DE) .......................... 10 2007 062 132

(51) Int. Cl.
*B05B 15/00* (2006.01)
(52) U.S. Cl.
USPC .............................................. 239/71; 239/74
(58) Field of Classification Search
USPC ..................................................... 239/71–75
See application file for complete search history.

(56) References Cited

U.S. PATENT DOCUMENTS

| | | | | |
|---|---|---|---|---|
| 4,668,948 A * | 5/1987 | Merkel | ........................ | 340/606 |
| 4,720,801 A | 1/1988 | Boll | | |
| 4,824,016 A * | 4/1989 | Cody et al. | ......................... | 239/8 |
| 4,917,296 A * | 4/1990 | Konieczynski | ................... | 239/1 |
| 4,934,598 A | 6/1990 | Schnetzer et al. | | |
| 5,207,381 A * | 5/1993 | Gill | ................. | 239/72 |
| 5,310,114 A * | 5/1994 | Cann | ................. | 239/74 |
| 5,363,699 A * | 11/1994 | McCall | .......................... | 73/198 |
| 6,059,884 A | 5/2000 | Seitz et al. | | |
| 6,135,357 A * | 10/2000 | Herrin et al. | ....................... | 239/4 |
| 6,205,853 B1 * | 3/2001 | Dei et al. | ......................... | 73/168 |
| 6,438,239 B1 * | 8/2002 | Kuchen | ......................... | 381/71.1 |
| 6,457,655 B1 * | 10/2002 | Reighard et al. | .................. | 239/8 |
| 6,758,423 B1 * | 7/2004 | Perkins et al. | ................ | 239/690 |
| 7,275,702 B2 * | 10/2007 | Nolte et al. | .................... | 239/700 |

(Continued)

FOREIGN PATENT DOCUMENTS

| | | |
|---|---|---|
| DE | 3913584 A1 | 10/1990 |
| DE | 10307719 A1 | 9/2003 |
| DE | 29724794 U1 | 5/2004 |
| DE | 20122250 U1 | 10/2004 |
| DE | 60104666 T2 | 8/2005 |

(Continued)

OTHER PUBLICATIONS

International Search Report dated Feb. 23, 2009.

*Primary Examiner* — David A Rogers
(74) *Attorney, Agent, or Firm* — Bejin VanOphem & Bieneman PLC (57) ABSTRACT

The disclosure relates to a test method for functional testing of a painting device, comprising: connecting a test device to the painting device, capturing at least one process parameter of the painting device, and checking of a functionality of the painting device by the test device using the captured process variables of the painting device. The disclosure further relates to a corresponding test device for performing the method.

31 Claims, 5 Drawing Sheets

(56) References Cited

U.S. PATENT DOCUMENTS

| | | | |
|---|---|---|---|
| 2003/0121999 A1* | 7/2003 | Huebel | 239/585.1 |
| 2003/0154920 A1 | 8/2003 | Charpin | |
| 2005/0082383 A1* | 4/2005 | Hagleitner | 239/73 |
| 2005/0107896 A1* | 5/2005 | Kucera et al. | 700/65 |
| 2005/0263611 A1* | 12/2005 | Gotoh et al. | 239/102.1 |
| 2007/0240641 A1 | 10/2007 | Lind | |
| 2008/0295768 A1* | 12/2008 | Micheli et al. | 118/300 |
| 2010/0145516 A1* | 6/2010 | Cedoz et al. | 700/258 |
| 2010/0211205 A1* | 8/2010 | Baumann et al. | 700/109 |

FOREIGN PATENT DOCUMENTS

| | | |
|---|---|---|
| DE | 102005044154 A1 | 4/2007 |
| EP | 0166092 A1 | 1/1986 |
| EP | 0350605 A2 | 1/1990 |
| EP | 0846498 A1 | 6/1998 |
| EP | 0899018 A1 | 3/1999 |
| EP | 1232799 A2 * | 8/2002 |
| GB | 2321206 A | 7/1998 |
| JP | 10244205 A | 9/1998 |
| WO | WO-2005110613 A1 | 11/2005 |

* cited by examiner

TEST METHOD AND TEST APPARATUS FOR CHECKING THE FUNCTION OF A PAINTING DEVICE

CROSS-REFERENCE TO RELATED APPLICATIONS

This application is a National Phase application claiming the benefit of International Application PCT/EP2008/010241, filed Dec. 3, 2008, which claims priority to German Patent Application No. DE 10 2007 062 132.0, filed Dec. 21, 2007, the complete disclosures of which are hereby incorporated in by reference in their entireties.

BACKGROUND

The present disclosure relates to exemplary test methods and corresponding test apparatuses for checking the function of a painting device.

Modern painting installations for series-painting of motor vehicle body parts have an increasing complexity, since the painting installations include a plurality of components which are at least partially user-specific or application-specific that are combined with each other. Further, a better tuning of the installation components on each other is necessary due to the higher utilization and the higher dynamic of the painting installations.

Thus, so-called air atomizers or high-speed rotary atomizers, for example, were used as application apparatus which are optionally operated with or without electrostatic coating agent charge. Furthermore, the painting installations can be operated optionally with a wide variety of coating types, including one component paints ("1K paint"), two component paints ("2K paint"), more component paints ("XK paint") or powder paint. Further, a coating agent mixer can be optionally arranged externally or can be integrated within the atomizer. Although with respect to the flushing of the painting installation there are several options, for example the so-called 1-circle-flushing, the so-called 2-circle-flushing as well as the use of the known pick technology ("reflow" and "push-out"). Moreover, the dosing of the coating agent can be carried out via dosing pumps or via dosing cylinders and the electrostatic charging of the coating agent can be carried out optionally via direct charging, via external charging or in the case of powder paint through friction charging.

Modern painting installations thus have a plurality of specialized components which can be respectively designed in different variants and combinations that have to function with each other.

Thus, it is typical to perform two function checks for securing a correct function with regard to the painting installations, wherein the first function check is carried out after mounting or before commissioning, whereas the second function check is carried out during commissioning at the customer.

However, function checks are carried out manually which has several drawbacks that are shortly described below.

On the one hand, the manual function check requires a relatively long test period and as a rule at least two workers.

A further drawback of the manual function check can be seen in the person-dependent quality of the function check, since for example careless or unqualified workers may overlook function failures of the painting installation.

Further, a documentation of the manual function check is difficult due to the number of variables involved, which can result in legal proof problems with regard to complaints or warranty claims of customers.

A particularly important drawback of the manual function checks are the high costs for the function check and the possible high subsequent failure costs that can occur due to unrecognized failures.

Finally, manual function checks are time consuming, and therefore the function checks are typically used minimally in order to reduce overall labor costs during assembly, commissioning, or use in production, when for example a redesign of the painting installation had to be carried out during a time limited production stop (for example at the weekend).

DE 101 08 010 A1 discloses a checking pin that can be electrically connected to a painting device to check, for example, the voltage supply of the painting device. However, this known checking pin enables only a passive check of the painting device and is also restricted on electrical process parameters of the painting device such that no comprehensive function check is possible.

Further, EP 0 846 498 A1, DE 103 07 719 A1, DE 201 22 250 U1, DE 101 08 010 A1, GB 2 321 206 A, DE 297 24 794 U1, U.S. Pat. No. 6,758,423 B1, DE 601 04 666 T2, EP 166 092 A1, EP 350 605 A2, WO 2005/110613 A1 disclose monitoring systems for painting devices which enable only a monitoring of the painting device in the normal operation and are thus dependent on the normal electrical and respectively fluidic control. These are thus no generic test apparatuses or test methods.

Accordingly, there is a need for an improved function check of painting installations.

BRIEF DESCRIPTION OF THE FIGURES

Various exemplary illustrations are characterized in more detail below together with the description and with the aid of the figures. It shows.

DETAILED DESCRIPTION

The exemplary illustrations include the general technical teaching to carry out the function check of painting devices (e.g. painting installations, rotary atomizers) no longer—as until now—manually, but by an exemplary test apparatus.

For this, the test apparatus may be connected to the painting device to be checked (e.g. painting installations, painting robots, rotary atomizers, pistols, potential separation, special paint supply, cleaning apparatuses).

Subsequently, any process parameters associated with the coating installation (e.g. valve positions, paint flow, air flow, pressures, flushing programs, electrostatic charging voltage, etc.) of the painting device may be detected by the test apparatus via the connection.

The test apparatus may further check the functionality of the painting device based on the detected process parameters of the painting device.

According to one exemplary illustration, the test apparatus does not only detect the process parameters of the painting device passively, but affects or modifies the process parameters of the painting device actively in order to be able to detect and check the reaction of the painting device. For example, a control of the painting device may be initiated by the test apparatus, whereupon the test apparatus detects the reaction of the process parameters of the painting device in response to parameters modified by the test apparatus. Then, the test apparatus may check the functionality of the painting device based on the detected reaction of the process parameters of the painting device. Accordingly, the test apparatus can set certain test procedures which will be then run through by the painting device, wherein the test apparatus detects the reaction of the painting device and, respectively, the behaviour of the painting device during the test procedures and determines the functionality of the painting device based thereon.

In one example, the test apparatus is connected to the painting device to be checked by means of a single or universal adapter. This is advantageous since the connection between the test apparatus and the painting device to be checked can be accomplished quickly and may generally simplify the checking process.

The adapter may establish an electrical cable connection as well as a fluidic line connection between the test apparatus and the painting device to be checked. The test apparatus may detect and/or affect electrical process parameters (e.g. valve positions, electrostatic charging voltages) of the painting device via the adapter. Moreover, the test apparatus may also detect and/or affect fluidic process parameters (e.g. paint flow, flushing agent flow, air flow, etc.) of the painting device via the adapter.

For example, the test apparatus can create all fluid flows in the tested device(s) via the adapter which are necessarily for the operation of the painting device (e.g. rotary atomizer), as for example driving air for a rotary atomizer turbine, shaping air, pulsed air, flushing agent flow and paint flow. This provides advantageously the possibility that the painting device to be checked can be connected alone to the test apparatus and be checked by the test apparatus without the need for a further external connection of the painting device, e.g., to production equipment associated with the tested device(s).

In another exemplary illustration, a connection between the test apparatus and the painting device(s) to be checked is carried out by a plurality of adapters, wherein a first adapter connects the painting device electrically to the test apparatus, while a second adapter connects the painting device fluidically to the test apparatus.

The exemplary illustrations also provide the option that the painting device to be checked has a dosing pump with an adjustable flow rate and a main needle valve with an adjustable valve position. The main needle valve may have a certain or predetermined switch time that is given by pressures and pressure relations, hose cross sections, line lengths, bus running times, friction, etc. This switch time may thus be detected and maintained, e.g., constantly, by the control of the painting device. This circumstance may be taken into account by a delay time between the control signal for the main needle valve and the dosing pump start. This delay time can be a positive value as well as a negative value. This inter alia depends on the installation configuration and the component position. If the delay time is incorrectly set, overpressures or underpressures may occur which can result in hose bursts or coating malfunctions. Accordingly, the test apparatus can detect and/or control as function-relevant process parameters the flow rate of the dosing pump and the valve position of the main needle valve and evaluate in the framework of the function check the time relationship between the flow rate of the dosing pump and the valve position of the main needle valve.

Further, the exemplary illustrations may also allow painting device to be checked that has a pulsed air feeding line and flushing agent feeding line, wherein so-called pulsed air for cleaning is fed via the pulsed air feeding line, while a flushing agent is fed via the flushing agent feeding line in a conventional manner. The test apparatus can detect as function-relevant process parameters of the painting device the pulsed air flow and the flushing agent flow and in the framework of the function check evaluate the time relationship between the pulsed air flow and the flushing agent flow.

It is to be mentioned that the flushing agent may become contaminated during a flushing process such that the purity degree of the emerging flushing agent from the test apparatus can be evaluated as function-relevant process parameter, since the purity degree of the emerging flushing agent allows a conclusion on the efficiency of the flushing program. For example, the purity degree of the flushing agent can be derived from lucidity, light transmitting capacity and respectively transparency of the flushing agent, since contaminated flushing agent has a reduced light transmitting capacity. In the framework of the test method according to the exemplary illustrations, it is possible that the purity degree of the emerging flushing agent is detected as function-relevant process parameter of the painting device. Depending on the determined purity degree of the emerging flushing agent, flushing programs can be tested and respectively automatically developed.

Further, in another exemplary illustration the possibility exists that the painting device to be checked applies a multi-component paint having a stock paint and a hardener as components, wherein the test apparatus detects the stock paint flow and the hardener flow as function-relevant process parameters of the painting device and in the framework of the function check evaluates a time relationship between the stock paint flow and the hardener flow.

Exemplary test methods may also be suitable for checking the function of a painting device having an installation control to control the operation of the painting device. The installation control may detect as a rule anyway a large number of process parameters of the painting device and enable furthermore its specific control in the framework of a function check. In such painting devices having an installation control, the test apparatus may be connected to the installation control of the painting device and may communicate with the installation control so that the test apparatus can detect and/or affect desired process parameters of the painting device via the installation control.

It is already apparent from the description above that the exemplary illustrations are not restricted to a novel test method for checking the function of a painting device, but also include a corresponding exemplary test apparatus that carries out the exemplary methods.

For this, an exemplary test apparatus may have a connection via which the test apparatus can be connected to the painting device to be checked.

Further, an exemplary test apparatus may include a detection unit that detects process parameters of the painting device via the connection when the test apparatus is connected to the painting device.

Further, an exemplary test apparatus may have an evaluation unit that checks the functionality of the painting device based on the detected process parameters of the painting device.

The aforementioned detection unit and the also aforementioned evaluation unit may—as the following further described functional units of the exemplary test apparatus—be provided as separate parts, e.g., hardware, and respectively assemblies. Alternatively, the option exists that individual functional units (e.g. detection unit, evaluation unit) are provided as software modules in a test program.

In one example, a test apparatus has additionally a control unit to control the painting device, wherein the evaluation unit considers, e.g., during checking, the functionality of the painting device and the reaction of the process parameters of the painting device on the control by the control unit. In this example, the test apparatus thus detects not only the function-relevant process parameters of the painting device in a passive manner, but also controls the painting device actively. Here, the test apparatus can thus check the reaction of the painting device to a certain control, e.g., a particular change in operating parameters of the tested device(s).

Further, the test apparatus may advantageously include a computing unit having a program memory in which at least one checking program is stored. For example, the checking program can be configured to set in which manner the painting device to be checked is controlled by the test apparatus, e.g., by providing a sequence of tested parameters and adjustments during a function check.

The control of a function check by the checking programs may generally have the advantage of a better reproducibility of the function checks and decreased time expenditure associated with the function check.

The possibility also exists that a plurality of checking programs are provided to respectively check certain functional fields of the painting device. For example, separate checking programs can be provided for checking the tightness of the painting device, for checking the electrostatic coating agent charging, for checking the dynamic of the painting device, for checking the dosing precision and for checking the individual coating channels of the painting device.

An exemplary test apparatus may also have an integrated screen and/or an integrated printer to illustrate or provide a visual reference for results of the function check.

Further, the option exists that an exemplary test apparatus includes an interface to which for example an external printer and/or external screen can be selectively connected.

The exemplary illustrations thus may enable several kinds of visualisation of the process parameters of the painting device, wherein also printers, recorders and software-technical recording apparatuses can be used for this purpose which are present in the painting device to be checked.

With regard to the function-relevant process parameters of the painting device various possibilities exist, wherein some of them will be shortly described below. Accordingly, the listed process parameters are merely exemplary, and any process parameters may be employed in the context of a function check performed by exemplary apparatuses and methods that are convenient.

For example, the test apparatus can detect and/or specifically affect in the painting device in the framework of the function check a valve position of controllable valves (e.g. main needle valve).

Further, the function-relevant process parameters may include electrical process parameters, for example a charging voltage and/or a charging current of an electrostatic coating agent charging.

With regard to a voltage regulation or a current regulation of the electrostatic coating agent charging also regulation-technical parameters (e.g. regulation deviation, correcting variable) may be detected and respectively specifically affected as function-relevant process parameters.

Further, it is possible that switch positions of electrical switches in the painting device may be detected or specifically affected as electrical process parameters which is, for example, possible with regard to ground switches and/or disconnecting switches.

Further, the possibility exists that an electrical capacity of the painting device or of a part of the painting device is detected as function-relevant electrical process parameter.

Moreover, in the framework of the exemplary illustrations, fluidic process parameters of the painting device can also be detected and/or specifically affected.

Examples for such fluidic process parameters include, but are not limited to, a coating agent flow (volume flow or mass flow) of a coating agent applied by the painting device or the pressure, in particular the coating agent pressure, the flushing agent pressure, the shaping air pressure, the pulsed air pressure and/or the dosing pressure.

Further examples for function-relevant fluidic process parameters of the painting device may include a flushing agent flow, an air flow, e.g., a shaping air flow, or a pulsed air flow.

Finally, temperatures in the painting device may also be detected as function-relevant process parameters of the painting devices.

An exemplary test apparatus may be portable or mobile to enable a flexible use of the test apparatus in different locations.

Further, it is to be mentioned that the painting device to be checked can include, merely as examples, an atomizer, a painting robot or a complete painting installation.

With regard to the function check of an atomizer, the test apparatus may be connected directly to the connecting flange of the atomizer such that for operating the atomizer no further connections are necessary.

Finally, it should be mentioned that for checking the function, the test apparatus can be connected in a wireless or lineless manner to the painting device. This is in particular possible if the painting device to be checked is controlled by an integrated installation control.

Figure 1A:
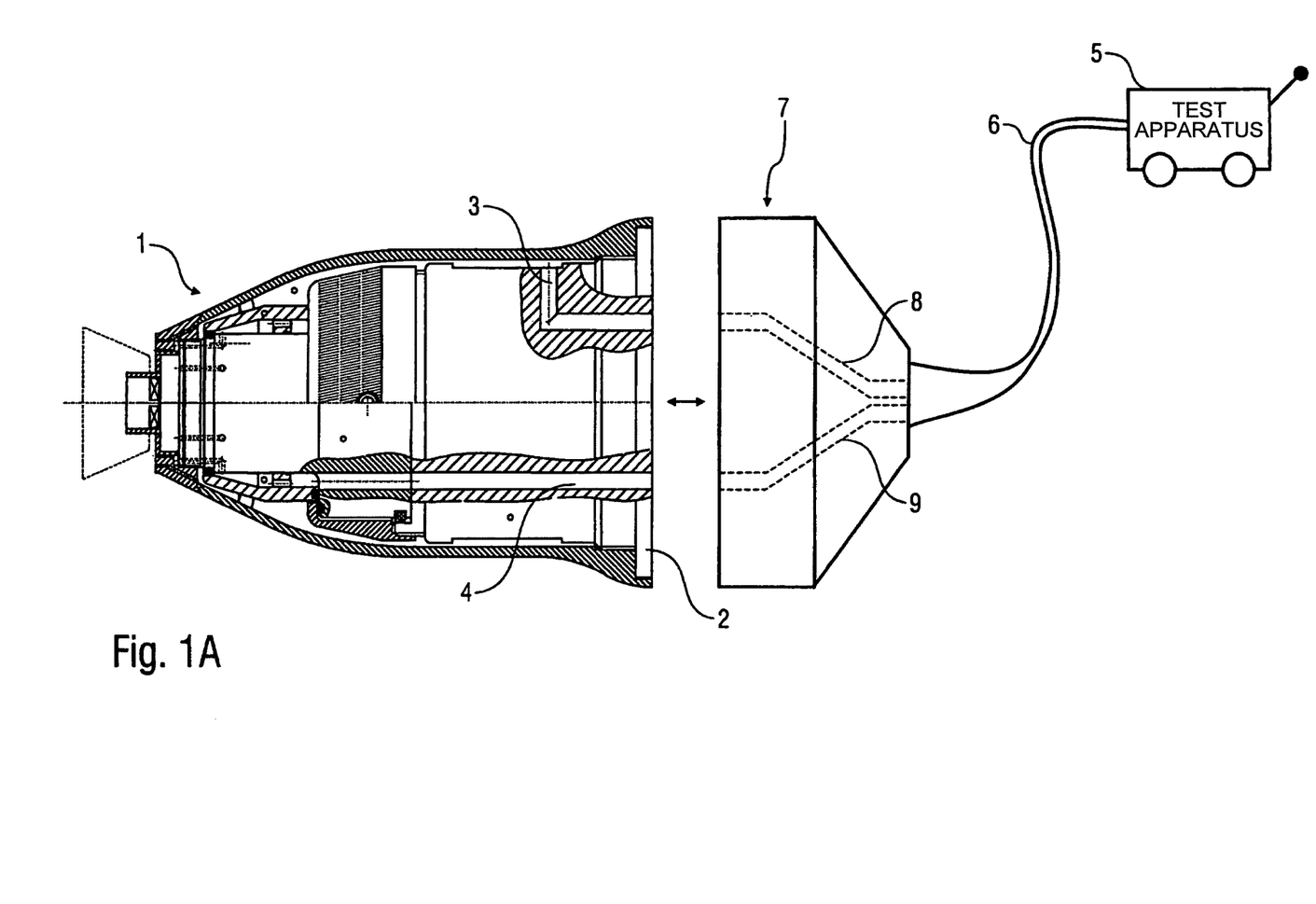
FIG. 1A illustrates a simplified cross-sectional view of an exemplary rotary atomizer as well as an exemplary test apparatus with an adapter for connection to the connecting flange of the rotary atomizer.
Figure 1B:
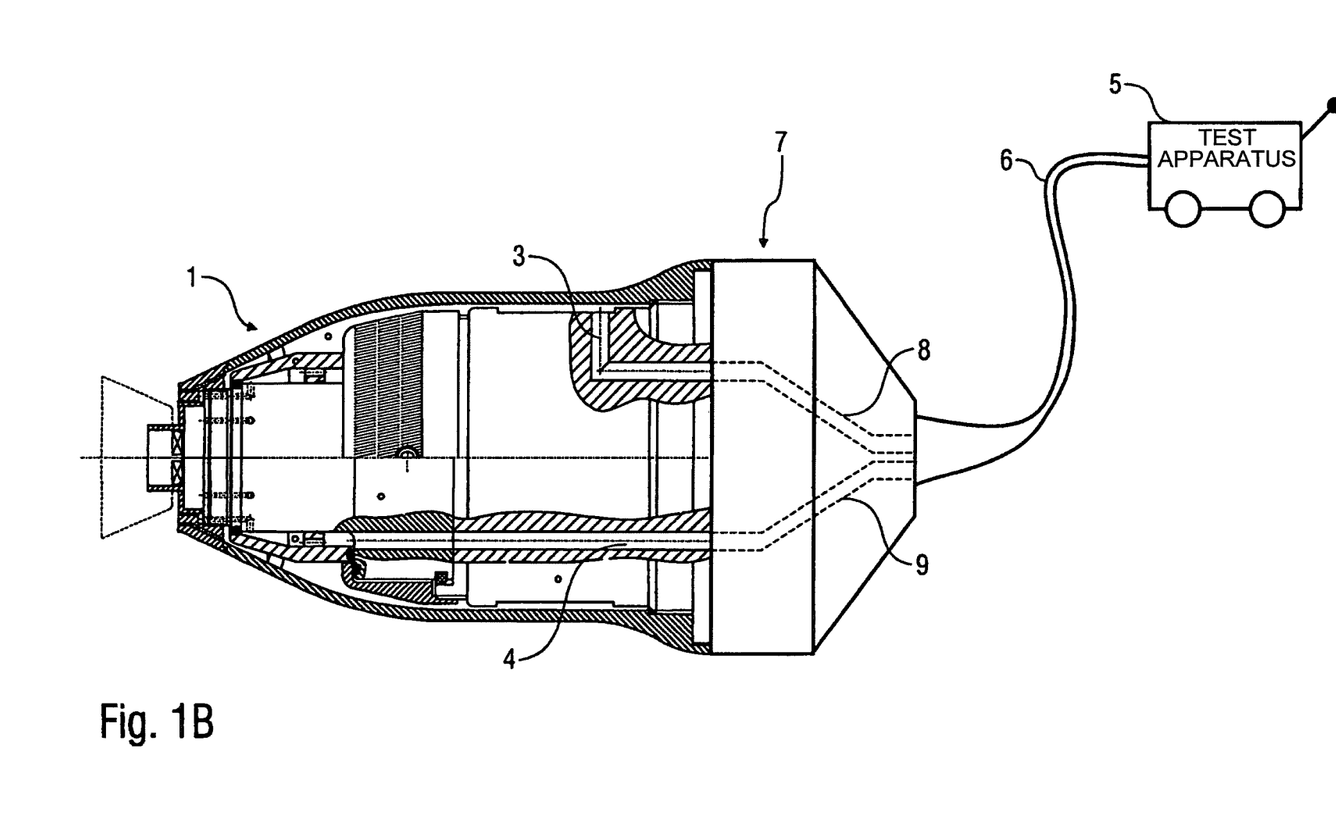
FIG. 1B illustrates the rotary atomizer of FIG. 1B with connected adapter during a function check.

FIGS. 1A and 1B illustrate a rotary atomizer 1 that can be used, for example, for painting of motor vehicle body parts and whose construction and operation is described. For example, a rotary atomizer as is generally described in DE 10 2005 044 154 A1 may be employed, such that reference is made to the aforementioned publication with regard to the construction and the operation of the rotary atomizer described therein, which content is hereby expressly incorporated by reference herein in its entirety. The rotary atomizer 1 may include a connecting flange 2 via which the rotary atomizer 1 can be mounted, for example, on a robot hand axis of a painting robot.

Further, a fluidic and electrical contacting of the rotary atomizer 1 may be established via the connecting flange 2 of the rotary atomizer 1. For example, shaping air flows may be fed via two shaping air lines 3, 4 which are controllable separately from each other and enable shaping of the spray jet.

Moreover, the connecting flange 2 of the rotary atomizer 1 may include further connections which serve for fluidic contacting of the rotary atomizer 1 and which are not shown in the figure for simplification. For example, the connecting flange 2 of the rotary atomizer has a connection for feeding driving air for driving a turbine arranged within the rotary atomizer 1.

A further possibility is to directly connect the flange to the atomizer, e.g. without a bell cup, in order to thus also detect atomizer functions therewith.

Moreover, the connecting flange 2 of the rotary atomizer 1 may include a connection for feeding the paint to be applied as well as a connection for return of the paint not applied to enable a paint circulation.

Further, depending on the type of the rotary atomizer 1, the connecting flange of the rotary atomizer 1 may have further connections for fluidic contacting of the rotary atomizer 1.

In addition to the above described connections for fluidic contacting of the rotary atomizer 1, the connecting flange 2 also may include electrical connections to enable electrical contacting of the rotary atomizer 1. For example, the connecting flange 2 can also include an electrical connection for electrostatic charging of the coating agent applied by the rotary atomizer 1 by direct charging.

Further, also an optical contact of the rotary atomizer 1 may be established via the connecting flange 2. For example, a turbine wheel of the turbine arranged within the rotary atomizer 1 may have optical marks that are scanned from an optical fibre and enable a detection of a rotational speed and the direction of rotation of the turbine wheel. The other end of this optical fibre may be guided to the connecting flange 2 and optically read out there correspondingly.

Further, the drawings show an exemplary test apparatus 5 that is designed in this illustration as mobile hand card and enables an autarkic or generally automatic function check of the rotary atomizer 1 without the need for connecting the rotary atomizer 1 to further supply lines (e.g. compressed air, high voltage).

For this, the test apparatus may be connected to the connecting flange 2 of the rotary atomizer 1 via a line packet 6 and an adapter 7.

Here, on the one hand, the adapter 7 may be configured to establish a mechanical connection to the connecting flange 2 of the rotary atomizer 1.

On the other hand, the adapter 7 may also contact several connections in the connecting flange 2 of the rotary atomizer 1, wherein in the drawings only corresponding connections 8, 9 for the shaping air lines 3, 4 are illustrated for simplification. The adapter 7 may include corresponding connections for the other connections (e.g. paint, driving air, high voltage, return line, not shown in FIG. 1A) in the connecting flange 2 of the rotary atomizer 1.

The test apparatus 5 may contain a high voltage generator via which the electrostatic coating agent charge of the rotary atomizer 1 can be supplied with high voltage, e.g., when the rotary atomizer 1 is tested.

Moreover, the test apparatus 5 may also contain a compressed air source to apply the rotary atomizer 1 with the compressed air, as may be required for test purposes.

Moreover, the test apparatus 5 may convey a coating agent or a corresponding simulation liquid to the rotary atomizer 1 via the adapter 7.

The test apparatus 5 generally enables an operation of the rotary atomizer 1 in line with use of the atomizer 1 during a production coating process, e.g., as on a robot hand axis of a painting robot.

Furthermore, the test apparatus 5 may include a control processor having a program memory in which one or more check programs are stored. A user may choose via an input interface (e.g. keyboard, mouse, touch screen) one of the desired check programs, whereupon the test apparatus 5 then controls the rotary atomizer 1 according to the chosen check program. In doing so, the behaviour of the rotary atomizer 1 is generally continuously measured in the test apparatus 5 to check the function of the rotary atomizer 1. For example, the rotational speed and the direction of rotation of the rotary atomizer 1 may be continuously measured via the optical interface of the adapter 7. Moreover, the pressures in the different lines may also be measured. The test apparatus 5 may then checks whether the reaction of the rotary atomizer 1 and respectively the process parameters (e.g. shaping air pressure, driving air pressure, electrostatic charging current) on the control by the test apparatus 5 is indicative of a correct or expected operation.

Figure 2:
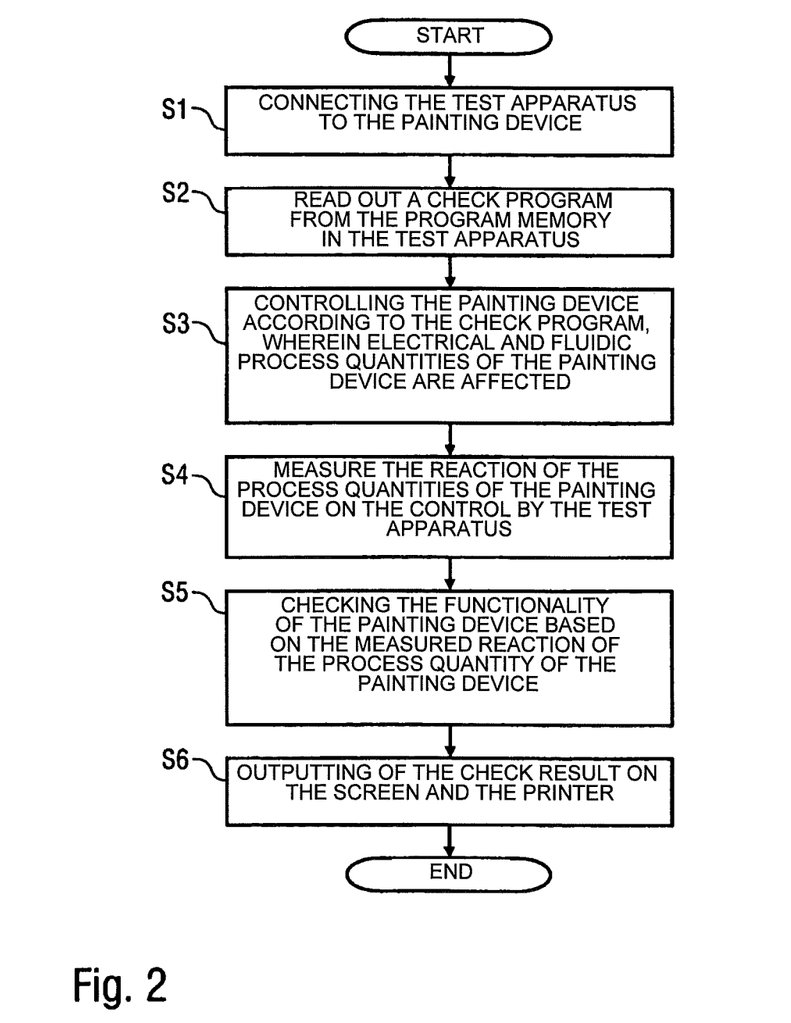
FIG. 2 illustrates an exemplary test method in form of a flow chart.

Turning now to FIG. 2, a flow chart illustrating an exemplary test method is described.

Firstly, in a first block S1, a connection between the test apparatus 5 and the rotary atomizer 1 may be established by connecting the adapter 7 to the connecting flange 2 of the rotary atomizer 1.

In a further block S2, the user may then choose via an input interface (e.g. a keyboard) on the test apparatus 5 a check program from the program memory in the test apparatus 5.

The test apparatus 5 may then control the rotary atomizer 1, e.g., via the adapter 7, in block S3 according to the chosen check program. As described above electrical process parameters (e.g. electrostatic charging voltage) and/or fluidic process parameters (e.g. paint flow, shaping air flow, driving air flow) of the rotary atomizer 1 may be specifically affected.

Proceeding to block S4, during the control of the rotary atomizer 1 with the chosen check program the test apparatus 5 may generally continuously measure a reaction or response of one or more process parameters (e.g. driving air pressure, shaping air pressure, electrostatic charging voltage, etc.) of the rotary atomizer 1 on the control by the test apparatus 5.

Proceeding to block S5, the functionality of the rotary atomizer 1 may be checked by means of the measured reaction of the rotary atomizer 1. For example, measured reactions or responses of one or more of the process parameters may be compared with an expected or desired response, e.g., as associated with correct functioning of a monitored device.

Proceeding to block S6, a check result may be output from the test apparatus 5, e.g., via a screen and/or an integrated printer. Furthermore, the check result may alternatively or in addition be output electronically by the test apparatus 5, e.g., via an output interface in a file format, or stored.

Figure 3:
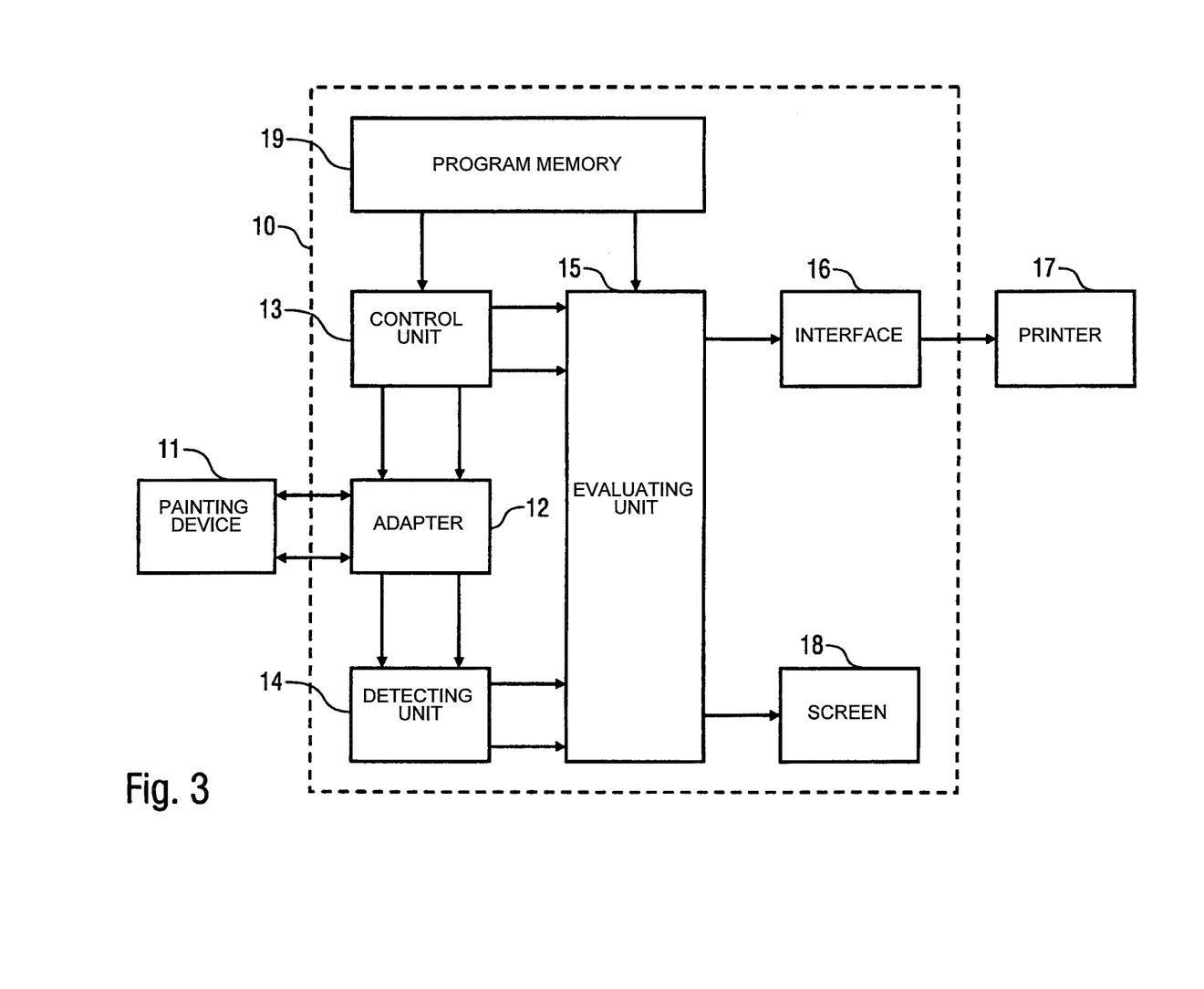
FIG. 3 is a simplified block diagram of an exemplary test apparatus.

FIG. 3 shows in a very simplified illustration an exemplary construction of an exemplary test apparatus 10 for checking the function of a painting device 11.

The painting device 11 can be, for example, a rotary atomizer, as described above. Alternatively, the possibility exists that the painting device 11 to be checked is a complete painting robot or even a complete painting cell.

For carrying out the checking of the function the test apparatus 10 may be connected to the painting device 11 to be checked via an adapter 12. For example, the adapter 12 may enable a fluidic and/or electrical contacting of the painting device 11.

Further, the test apparatus 10 may include a control unit 13 that enables the apparatus 10 to specifically affect process parameters of the painting device 11 via the adapter 12, such that the apparatus 10 may draw conclusions on the functionality of the painting device 11 based on the subsequent reaction of the painting device 11 on the control by the control unit 13.

Further, the test apparatus 10 may include a detection unit 14 that generally detects the process parameters of the painting device 11 via the adapter 12.

Furthermore, the test apparatus 10 may include an evaluation unit 15, which detects the control by the control unit 13 on the input side as well as the reaction of the process parameters of the painting device 11 measured by the detection unit 14. The evaluation unit 15 may then determine, e.g., from these input parameters, whether the painting device 11 is functional or has particular failures.

The check result may then be output via an interface 16 on an external printer 17 or can be illustrated on an integrated screen 18.

Finally, in this exemplary illustration the test apparatus 10 may include a program memory 19 in which multiple different check programs are stored, wherein the desired check program can be chosen by the user.

Figure 4:
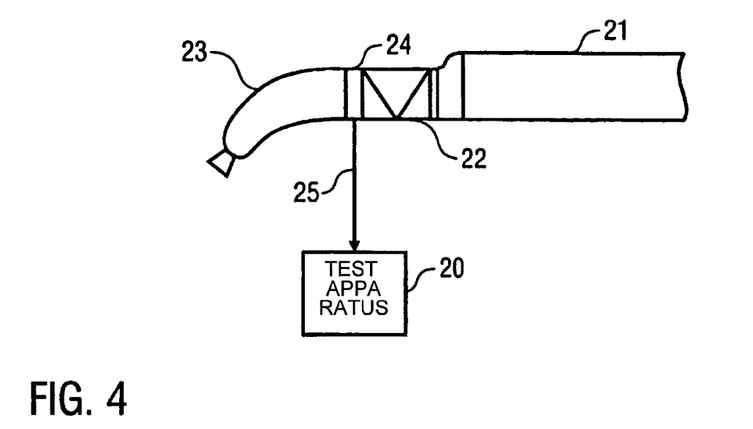
FIG. 4 illustrates another exemplary test apparatus having an adapter that can be mounted between a rotary atomizer and a robot hand axis.

FIG. 4 shows another exemplary test apparatus 20 for checking the function of a painting robot which guides a rotary atomizer 23 on a robot arm 21 and a robot hand axis 22.

Here, an adapter 24 is arranged between the rotary atomizer 23 and the robot hand axis 22, wherein the adapter 24 connects the robot hand axis 22 to the rotary atomizer 23. Here, fluids fed by the painting robot (e.g. paint, flushing agent, shaping air, etc.) are guided through the adapter 24 such that the adapter 24 can measure function-relevant process parameters via integrated sensors, such as, merely as examples, a paint flow, a flushing agent flow or a shaping air flow.

The test apparatus 20 may thus be connected via a line 25 to the adapter 24 to read out the sensor data from the adapter 24.

Figure 5:
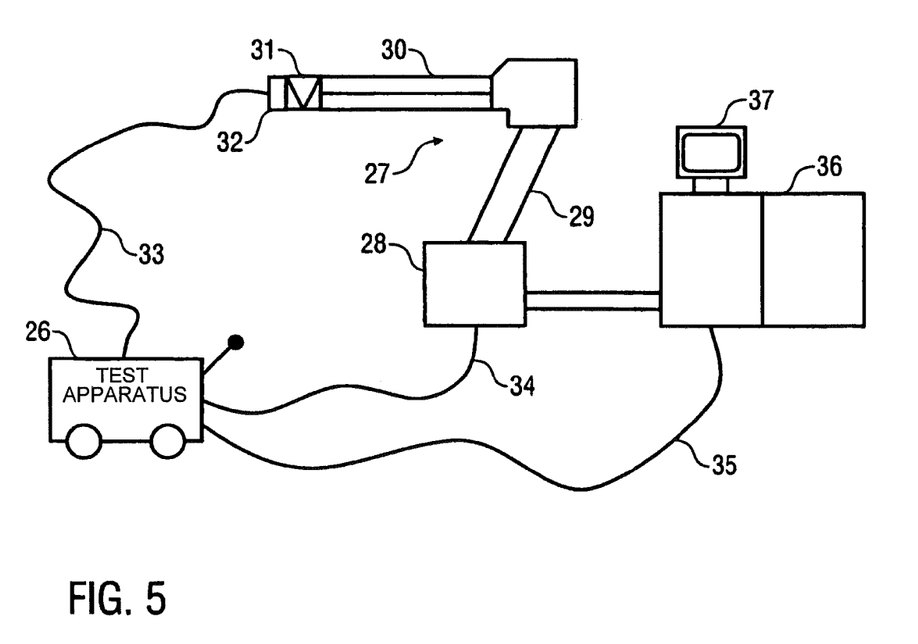
FIG. 5 illustrates another exemplary test apparatus having an adapter mounted instead of a rotary atomizer to a robot hand axis.

Finally, FIG. 5 shows a test apparatus 26 for checking the function of a painting robot 27 which can be formed in a conventional manner and has a base 28, two movable robot arms 29, and a robot hand axis 31, wherein in the normal operation a rotary atomizer is mounted to the robot hand axis 31.

However, the drawing shows a test operation in which instead of a rotary atomizer, an adapter 32 is mounted on the robot hand axis 31, wherein the adapter 32 is connected to the test apparatus 26 via a line packet 33.

On the one hand, the test apparatus 26 may receive via the line packet 33 fluids emitted by the painting robot 27 (e.g. paint, shaping air, driving air, etc.) and, in doing so, measure the pressure and the mass and respectively the volume flow.

On the other hand, the test apparatus 26 may also simulate via the line packet 33 a rotary atomizer and, for example, simulate the return line of flushing agent.

Furthermore, the test apparatus 26 may be connected via a line 34 also to the base 28 of the painting robot 27 to control the painting robot 27.

Finally, the test apparatus 26 may be connected via a line 35 additionally to an installation control 36 which enables a visualization via a screen 37.

The exemplary illustrations are not limited to the specific examples illustrated above. Rather, a plurality of variations and alterations are possible that also make use of the ideas described herein, and therefore fall within the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A test method for checking the function of a painting device, comprising:
    connecting a test apparatus to the painting device,
    detecting at least one process parameter associated with the painting device by the test apparatus,
    checking a functionality of the painting device by the test apparatus based on the at least one process parameter,
    carrying out control of the painting device using the test apparatus,
    detecting a change in the at least one process parameter following the control of the painting device, and
    determining whether the change in the at least one process parameter is indicative of expected operation of the painting device.

2. Test method according to claim 1, wherein the test apparatus is connected electrically to the painting device by a first adapter and fluidically to the painting device by a second adapter.

3. Test method according to claim 1, wherein
    the painting device to be checked includes a dosing pump having an adjustable flow rate and a main needle valve with an adjustable valve position,
    the detected process parameters of the painting device include the flow rate of the dosing pump and the valve position of the main needle valve, and
    wherein checking the functionality of the painting device by the test apparatus includes checking a temporal relationship between the flow rate of the dosing pump and the valve position of the main needle valve.

4. Test method according to claim 1, wherein
    the painting device to be checked has a pulsed air feeding line and a flushing agent feeding line,
    the detected process parameters of the painting device include the pulsed air flow and the flushing agent flow, wherein checking the functionality of the painting device by the test apparatus includes checking a temporal relationship between the pulsed air flow and the flushing agent flow.

5. Test method according to claim 1, wherein the painting device to be checked includes an installation control that controls the operation of the painting device, the test apparatus selectively communicates with the installation control of the painting device, the test apparatus receives the at least one process parameter of the painting device from the installation control of the painting device, and the test apparatus modifies the at least one process parameter of the painting device via the installation control of the painting device.

6. Test method according to claim 1, wherein the test apparatus is connected to the painting device to be checked by a single adapter.

7. Test method according to claim 6, wherein the one single adapter includes an electrical connection and a fluid line connection between the test apparatus and the painting device to be checked.

8. Test method according to claim 1, wherein the painting device to be checked applies a multi-component paint which includes as components at least one stock paint and at least one further component, the detected process parameters of the painting device include a flow of the stock paint and a flow of the further component, wherein checking the functionality of the painting device by the test apparatus includes checking a temporal relationship between the flow of the stock paint and the flow of the further component.

9. Test method according to claim 8, wherein the at least one further component includes a hardener.

10. Test method according to claim 1, wherein the painting device to be checked is a painting robot that guides an atomizer with one of a robot arm and a robot hand axis, the test apparatus is connected to the painting robot via an adapter, the adapter is arranged between the atomizer and the robot hand axis or between the robot hand axis and the robot arm.

11. Test method according to claim 10, wherein the painting device to be checked includes a connection flange for an atomizer, the test apparatus is connected to the connection flange of the painting device via an adapter, wherein the adapter replaces the atomizer.

12. A test apparatus for carrying out a test method, comprising:

a connection configured to selectively connect the test apparatus to a painting device, a detection unit configured to detect at least one process parameter of the painting device via the connection, when the test apparatus is connected to the painting device, an evaluation unit that checks a functionality of the painting device based on the at least one process parameter of the painting device; and a control unit configured to control the painting device, wherein the evaluation unit is configured detect a change in the at least one process parameter following control of the painting device by the control unit, and to determine whether the change in the at least one process parameter is indicative of expected operation of the painting device.

13. Test apparatus according to claim 12, wherein the connection includes at least two adapters, including:

a first adapter for electrical connection of the test apparatus to the painting device, and a second adapter for fluidic connection of the test apparatus to the painting device.

14. Test apparatus according to claim 12, further comprising a computing unit having a program memory in which at least one checking program is stored.

15. Test apparatus according to claim 12, wherein for illustrating a check result of the function check at least one visual tool is provided, the visual tool including one of a screen integrated in the test apparatus, a printer integrated in the test apparatus, and an output for connection to an external screen or an external printer.

16. Test apparatus according to claim 12, wherein the test apparatus is configured to carry out a test method according to claim 1.

17. Test apparatus according to claim 12, wherein the test apparatus is configured to modify at least one of the following process parameters of the painting device:

a valve position of the painting device, an electrical process parameter of the painting device, a fluidic process parameter of the painting device, or a temperature in the painting device.

18. Test apparatus according to claim 12, wherein the test apparatus is configured to modify at least one of the following electrical process parameters of the painting device:

a charging voltage or charging current of an electrostatic coating agent charge, wherein the electrostatic coating agent charge is selected from a group consisting of a direct charge, an external charge and a combination charge, a regulation-technical parameter of a voltage regulation or a current regulation of the electrostatic coating agent charge, a switch position of electrical switches of the painting device, wherein the electrical switch is selected from a group consisting of earth switches and disconnecting switches, or an electrical capacity of the painting device or a part of the painting device.

19. Test apparatus according to claim 12, wherein the test apparatus is one of portable and mobile.

20. Test apparatus according to claim 12, wherein the painting device to be checked is one of an atomizer, a rotary atomizer, and a painting robot.

21. Test apparatus according to claim 12, wherein the painting device to be checked is an atomizer having a connection flange, and the test apparatus is selectively connectable to the connection flange of the atomizer.

22. Test apparatus according to claim 12, wherein the test apparatus is connected via a wireless connection to the painting device.

23. Test apparatus according to claim 12, wherein the connection has only one single adapter via which the test apparatus is connected to the painting device to be checked.

24. Test apparatus according to claim 23, wherein the adapter includes an electric cable connection and a fluidic line connection between the test apparatus and the painting device to be checked.

25. Test apparatus according claim 12, further comprising
a program-controlled computer for carrying out the function check of the painting device, and
a program memory in which a plurality of checking programs are stored, wherein the checking programs control the function check of the painting device.

26. Test apparatus according to claim 25, wherein the stored checking programs are respectively function specific and are configured to check the following functional fields of the painting device:
a tightness of the painting device,
an electrostatic coating agent charge,
a dynamic of the painting device,
a dosing precision of the painting device,
an individual coating agent channels of the painting device.

27. Test apparatus according to claim 12, wherein the test apparatus is configured to modify at least one of the following fluidic process parameters of the painting device:
a coating agent flow of a coating agent applied from the painting device,
a pressure,
a flushing agent flow of a flushing agent for flushing of the painting device,
an air flow,
a valve position of a main needle valve,
a valve position of a flushing agent valve, or
a valve position of a coating agent valve.

28. Test apparatus according to claim 27, wherein:
the coating agent includes a paint,
the pressure is selected from a group consisting of coating agent pressure, flushing agent pressure, shaping air pressure, pulsed air pressure and dosing pressure, and
the air flow is selected from a group consisting of shaping air flow and pulsed air flow.

29. Test apparatus according to claim 12, wherein the test apparatus is configured to determine adjusting values for operating the painting device.

30. Test method according to claim 29, wherein the adjusting values include the following parameters:
a control time,
a delay value, and
a limiting value.

31. A test method for checking the function of a painting device, comprising:
connecting a test apparatus to the painting device,
detecting at least one process parameter associated with the painting device by the test apparatus, and
checking a functionality of the painting device by the test apparatus based on the at least one process parameter;
wherein the detected process parameters of the painting device include one or more of (i) a flow rate of a dosing pump and a valve position of a main needle valve, (ii) a pulsed air flow of a pulsed air feeding line and a flushing agent flow of a flushing agent feeding line, and (iii) a flow of a stock paint in a multi-component paint and a flow of a further component in the multi-component paint,
further wherein checking the functionality of the painting device by the test apparatus includes checking at least one temporal relationship; and
further wherein the at least one temporal relationship exists between at least one of (i) the flow rate of the dosing pump and the valve position of the main needle valve, (ii) the pulsed air flow and the flushing agent flow, and (iii) the flow of the stock paint and the flow of the further component.

* * * * *

UNITED STATES PATENT AND TRADEMARK OFFICE
CERTIFICATE OF CORRECTION

PATENT NO. : 8,567,694 B2
APPLICATION NO. : 12/809829
DATED : October 29, 2013
INVENTOR(S) : Frank Herre It is certified that error appears in the above-identified patent and that said Letters Patent is hereby corrected as shown below:

On the title page item [73] replace Assignee name "Durr Sysems GmbH, Bietigheim-Bissingen (DE)" with -- Dürr Systems GmbH, Bietigheim-Bissingen (DE) --.

Signed and Sealed this
Fifth Day of August, 2014

Michelle K. Lee
*Deputy Director of the United States Patent and Trademark Office*